United States Patent
Susarla et al.

(10) Patent No.: US 10,798,207 B2
(45) Date of Patent: *Oct. 6, 2020

(54) SYSTEM AND METHOD FOR MANAGING APPLICATION PERFORMANCE

(71) Applicant: NetApp, Inc., Sunnyvale, CA (US)

(72) Inventors: Sai Rama Krishna Susarla, Bangalore (IN); Scott Hubbard, Wichita, KS (US); William Patrick Delaney, Wichita, KS (US); Rodney A. Dekoning, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/895,845

(22) Filed: Feb. 13, 2018

(65) Prior Publication Data

US 2018/0176323 A1    Jun. 21, 2018

Related U.S. Application Data

(63) Continuation of application No. 14/521,602, filed on Oct. 23, 2014, now Pat. No. 9,930,133.

(51) Int. Cl.
| | |
|---|---|
| *G06F 15/167* | (2006.01) |
| *H04L 29/08* | (2006.01) |
| *H04L 12/911* | (2013.01) |
| *H04L 12/851* | (2013.01) |
| *G06F 9/50* | (2006.01) |

(52) U.S. Cl.
CPC ........... *H04L 67/2842* (2013.01); *G06F 9/50* (2013.01); *G06F 9/5011* (2013.01); *H04L 47/24* (2013.01); *H04L 47/78* (2013.01); *H04L 67/1097* (2013.01); *H04L 67/2852* (2013.01); *H04L 67/322* (2013.01); *G06F 2209/501* (2013.01)

(58) Field of Classification Search
CPC ......... H04L 43/16; H04L 47/24; H04L 47/78; H04L 67/2842
USPC ....................................................... 709/213
See application file for complete search history.

(56) References Cited

U.S. PATENT DOCUMENTS

| | | | |
|---|---|---|---|
| 5,377,352 | A | 12/1994 | Tanaka et al. |
| 6,353,869 | B1 | 3/2002 | Ofer et al. |

(Continued)

*Primary Examiner* — Umar Cheema
*Assistant Examiner* — Anh Nguyen
(74) *Attorney, Agent, or Firm* — Haynes and Boone, LLP

(57) ABSTRACT

A system and method for managing application performance includes a storage controller including a memory containing machine readable medium comprising machine executable code having stored thereon instructions for performing a method of managing application performance and a processor coupled to the memory. The processor is configured to execute the machine executable code to receive storage requests from a plurality of first applications via a network interface, manage QoS settings for the storage controller and the first applications, and in response to receiving an accelerate command associated with a second application from the first applications, increase a first share of a storage resource allocated to the second application, decrease unlocked second shares of the storage resource of the first applications, and lock the first share. The storage resource is a request queue or a first cache. In some embodiments, the second application is a throughput application or a latency application.

20 Claims, 7 Drawing Sheets

(56) References Cited

U.S. PATENT DOCUMENTS

| | | | |
|---|---|---|---|
| 7,376,738 B2* | 5/2008 | Snyder | G06F 9/5066 |
| | | | 709/226 |
| 9,189,408 B1 | 11/2015 | Douglis et al. | |
| 9,401,869 B1 | 7/2016 | Tang et al. | |
| 2007/0143546 A1 | 6/2007 | Narad | |
| 2008/0005736 A1 | 1/2008 | Apacible et al. | |
| 2010/0121935 A1 | 5/2010 | Holt | |
| 2011/0252166 A1 | 10/2011 | Padala et al. | |
| 2013/0138886 A1* | 5/2013 | Yamauchi | G06F 9/544 |
| | | | 711/120 |
| 2013/0290286 A1* | 10/2013 | Su | G06F 16/1774 |
| | | | 707/704 |
| 2014/0094615 A1 | 4/2014 | Burke et al. | |
| 2014/0325214 A1* | 10/2014 | Sadrolashrafi | G06F 21/6218 |
| | | | 713/165 |
| 2015/0106502 A1 | 4/2015 | Shakhmetov et al. | |
| 2016/0085289 A1 | 3/2016 | Khatib et al. | |

* cited by examiner

SYSTEM AND METHOD FOR MANAGING APPLICATION PERFORMANCE

RELATED APPLICATIONS

This application is a continuation of U.S. patent application Ser. No. 14/521,602, filed on Oct. 23, 2014, which is incorporated by reference herein in its entirety.

TECHNICAL FIELD

The present disclosure relates generally to computing systems, and more particularly to management of application performance for applications using a storage system.

BACKGROUND

In a computing environment using distributed storage, such as a storage area network (SAN) or network-attached storage (NAS), storage may be provided to one or more users or applications using a highly abstracted infrastructure. This means that the characteristics and locations of the disk drives, storage arrays, and servers where the actual storage takes place are typically hidden from the user or application accessing the storage. The user or application accesses the distributed storage by referencing its symbolic or virtual location, and the distributed storage system automatically translates the virtual location into a physical location where the requested storage is actually stored and forwards the storage request to the physical device at that location. This allows the vendor providing the storage to exercise extensive flexibility in deciding how and where to implement the storage as the distributed storage system may simply change how it translates the virtual location requested by the user or application. This includes the ability to move storage from one storage device to another to address capacity, workload, and/or other requirements. These changes in implementation details are often hidden or transparent from the application or the user, which access the storage by making storage requests using an interface, such as an application programming interface (API), and providing the virtual location information for the requested storage. These virtualized and/or abstracted features of distributed storage systems may make them useful in cloud computing systems.

And while distributed storage provides great flexibility to the storage provider, it often comes with some cost to the applications and/or users accessing the distributed storage. For example, distributed storage is typically accessed over a network, such as the Internet. This may add overhead to storage requests as both the storage request and the response to the storage request may have to travel across the network. At a minimum this introduces latency or delay in the handling of the storage requests. In some cases applications and/or users may be tolerant of high latency to storage requests, but in other cases high latency may unacceptably impact performance of the applications making the storage requests. Additionally, because the distributed storage is often shared by multiple applications and/or users, competition among the applications and/or users may result in temporary, or even extended, periods where one or more of the resources of the distributed storage system are unable to satisfy each of the demands placed on those resources by the storage requests from the applications and/or users. In some examples, one or more of the network links in the distributed storage system may not have sufficient bandwidth to transmit the data being requested. This may result in reduced performance of the affected applications. In some examples, one or more of the network switching devices and/or storage devices may not be able to handle the input/output operations (IOPS) associated with the storage requests. This may also reduce the performance of the affected applications.

To address the impact on the performance of applications, distributed storage systems often support one or more quality of service (QoS) mechanisms that may be used to reserve bandwidth and/or IOPS, control latency, and/or the like on an application-by-application basis. Unfortunately, the relationships between bandwidth, IOPS, and latency, and the performance of the applications are not always well understood, even by system administrators who have a specialized understanding of both the applications and the distributed storage system. Further, adjustments to the QoS mechanisms that impact bandwidth, IOPS, and latency cannot generally be made in isolation for one application, because adjustments to bandwidth, IOPS, and/or latency for one application may impact the bandwidth, IOPS, and/or latency of the other applications using the same distributed storage system.

Accordingly, it would be desirable to provide improved methods and systems for managing application performance though adjustments in QoS mechanisms of associated storage systems.

Figure 1:
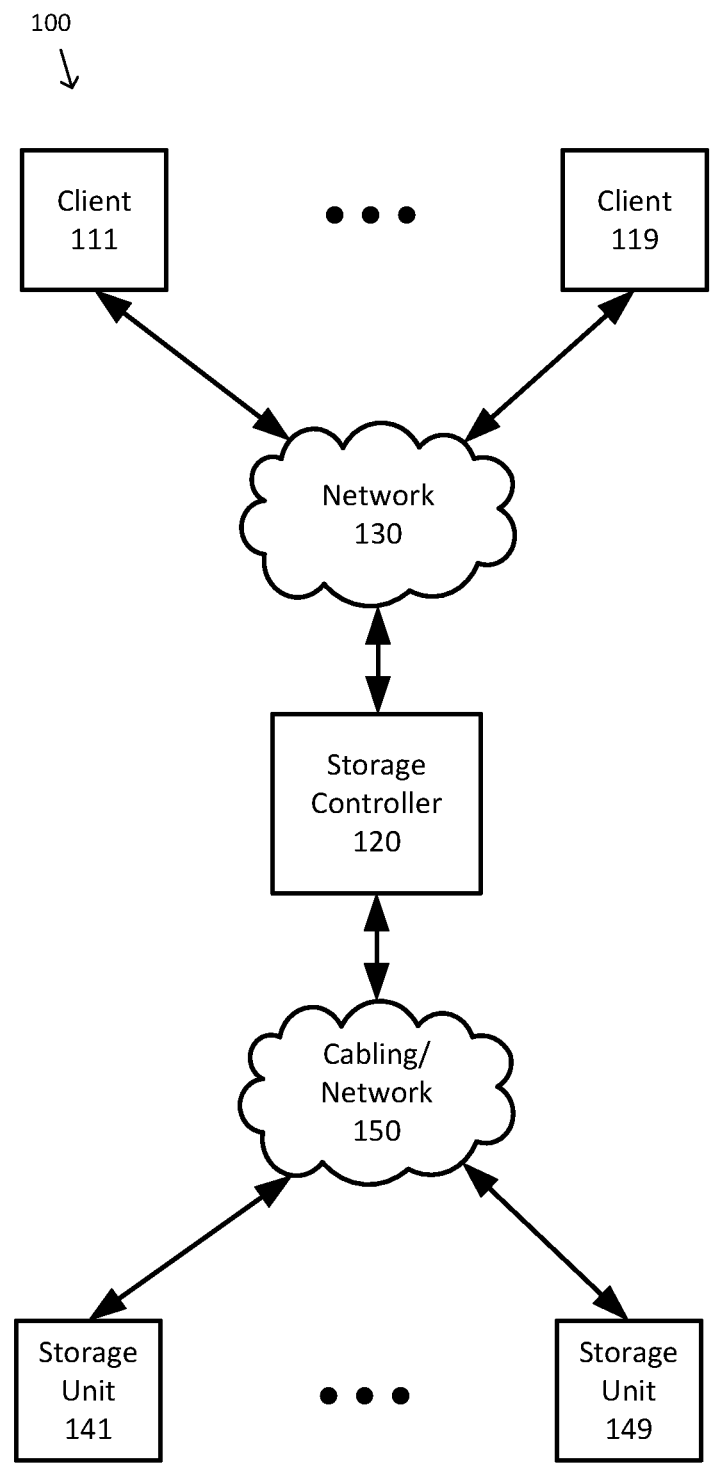
FIG. 1 is a simplified diagram of an example distributed storage system according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Management of applications using a shared storage system may present many challenges to the system administrator. This is because there is typically a complex relationship between the measurable and controllable characteristics of the storage system and the performance of the applications using the storage system. And while general principles, such as providing an application with greater access to storage system resources is likely to improve the performance of the application, even seasoned system administrators are often not able to accurately predict how much of an improvement in performance will result from giving one application greater access to a specific storage system resource. In addition, because the applications are typically competing for the resources of the storage system, giving the one application greater access to the specific system resource may result in undesired reductions in the performances of other applications using the storage system. Consequently, the management of storage system resources to meet the performance requirements of the applications using the storage system may be difficult.

To simplify this task somewhat, applications may be classified into one or more categories depending upon which characteristics of the storage system may be of more importance to the particular application. For example, an application involving frequent access to real-time data may desire storage system access with low delays or latency, an application involving the exchange of very large volumes of data may desire storage system access with a high data rate or bandwidth, and an application generating a large number of storage system requests may desire storage system access that supports a large number of storage or I/O operations per second (IOPS). Several quality of service (QoS) mechanisms are available that may be used to at least indirectly impact the latency, bandwidth, and/or IOPS available to an application. For example, the latency of storage requests for an application may be improved by giving the application a larger amount of cache (high-speed) memory that stores frequently accessed data or using a cache memory that is closer to the computer running the application. Bandwidth and/or IOPS available to an application may be improved by giving storage requests for the application a higher priority or having the storage system process a larger number of storage requests during a given time period.

Unfortunately, the storage system is subject to practical limitations that limit the total amount of resources that are available to the applications. As resources are given to or reserved for one application, those resources are not available for other applications. For example, not every application can or should be allocated space in the closest cache memory, and the amount of storage in each cache memory is also limited. As more storage requests are processed for one application, the other applications generally get fewer storage requests processed. A system administrator who is not aware of these complexities and their interdependencies is likely to have difficulty making adjustments to the QoS mechanisms while still satisfying the performance demands of the applications.

One way to simplify the management of QoS mechanisms is for the storage controller of the storage system to support an intuitive interface usable by the system administrator. The interface can either be provided directly by the storage controller or the storage controller may provide support for the interface which is provided as part of a management system for the storage system. The system administrator may use the interface to protect the resources allocated to an application or allocate more resources to an application. The interface then performs adjustments to the QoS mechanisms that are likely to meet desired performance outcomes while also accounting for the interdependence among the QoS settings for each of the applications using the storage system. As a first step, each of the applications using the storage system is assigned into a QoS classification depending on which QoS setting is of more importance to the application. For example, applications with a greater dependency on low latency may be put in a latency classification and applications with a greater dependency on bandwidth or IOPS may be put in one or more throughput classifications. The system administrator is then provided with a list of applications currently using the storage system.

As the applications use the storage system, feedback may be provided to the system administrator regarding the performance of each of the applications. This feedback may be provided from one or more monitoring systems that are measuring the performance, feedback from users, and/or the like. For applications that are demonstrating acceptable performance, the system administrator may choose to protect that performance by designating that the QoS settings for the application be maintained. This may include protecting the amount or type of cache provided to an application in the latency classification so that it cannot be given to other applications or protecting the number of storage requests allocated to an application in the throughput classification so that changes made for other applications cannot reduce the number of storage requests. For applications that are demonstrating unacceptably low performance, the system administrator may choose to accelerate the performance of an application by increasing the QoS settings for the application. This may include giving the application more cache space or access to a faster cache or giving the application more storage requests depending upon whether the application is classified as a latency or a throughput application. Of course, any additional cache space or storage requests are then taken from other applications, but rather than taking it from each of the other applications, the cache space or storage requests are taken from the applications whose QoS settings are not protected. And once an application has been accelerated, its QoS settings become protected. To be more flexible, several possible levels of acceleration may be supported, such high or low acceleration. If the performance of the application is still not acceptable, it may be accelerated again. And when the performance of an application no longer has to be protected, the system administrator may release or unprotect the QoS settings allowing them to be taken when other applications are accelerated.

Thus, under this approach the system administrator may more intuitively manage the performance of applications using the storage system. As appropriate the performance of applications may be protected or accelerated without the system administrator directly knowing or changing the QoS settings for each of the applications as the performance management system keeps track of the QoS settings as well as which QoS settings are protected and which are not. This allows the system administrator to focus on performance of the applications rather than worrying about the complex details of managing the QoS settings for the applications and the storage system or fully understanding how changing the QoS settings for one application is likely to negatively impact another application.

FIG. 1 is a simplified diagram of an example distributed storage system 100 according to some embodiments. As shown in FIG. 1, storage requests originate from one or more clients 111-119. The clients 111-119 may be host computers, servers, and/or other computing devices that include one or more applications that generate requests for data and information stored by distributed storage system 100. In some examples, the storage requests made by the applications on the clients 111-119 may be directed to a storage controller 120 that is coupled to the clients 111-119 using a network 130. Network 130 may include one or more network switching devices, such as routers, switches, hubs, and/or bridges, which forward the storage requests made by the applications to storage controller 120 and then forward responses to the storage requests back to the respective application. In practice, network 130 may be any kind of network including a local area network (LAN), such as an Ethernet, or a wide area network (WAN), such as the Internet.

In order to provide flexibility in how and where distributed storage system 100 stores the requested information and data and to isolate the applications from having to know the details of how distributed storage system is implemented, the storage requested by the applications may be identified by a storage unit identifier, such as a logical unit number (LUN), and a virtual address, such as a block number, that are included in each storage request made by the applications. The storage unit identifier and virtual address are then used by storage controller 120 to determine which of one or more storage units 141-149 is associated with the information or data requested in each of the storage requests.

Storage controller 120 is coupled to the storage units 141-149 using respective cables or a network 150. In some examples, one or more of the storage units 141-149 may be tightly coupled to storage controller 120 using respective cables in network 150. In some examples, the cables may include small computer system interface (SCSI) cables, universal serial bus (USB) cables, peripheral component interconnect (PCI, PCI-X, PCIe) cables, FireWire (IEEE 1394) cables, and/or the like. In some examples, one or more of the storage units 141-149 may be more indirectly coupled to storage controller 120 using one or more routers, switches, hubs, and/or bridges in network 150. Similar to network 130, network 130 may also be any kind of network including a LAN, such as an Ethernet, or a WAN, such as the Internet. In some embodiments, network 130 and network 150 may be a combined network.

During typical operation, applications on each of the clients 111-119 may generate storage requests, such as read or write requests, that are forwarded to storage controller 120 through network 130. Storage controller 120 examines each of the storage requests and uses information in the storage requests (e.g., the storage unit identifier and virtual address) to determine which of the storage units 141-149 is storing the requested information or data. The storage requests may then be placed in one of one or more queues depending upon how busy the distributed storage system 100 or the respective storage unit 141-149 is. The queue selected by storage controller 120 may depend on which of the storage units 141-149 is associated with the data, QoS settings for the application, and/or the like. Results of the storage request may then be returned to storage controller 120 and then back to the requesting application on the respective client 111-119.

Storage controller 120 may also be responsible for managing and/or enforcing the QoS settings used by storage system 100. In some examples, storage controller 120 may provide one or more management user interfaces to a system administrator so the system administrator may view, set, and/or adjust the QoS settings for the applications using the storage system 100. In some examples, storage controller 120 may provide one or more APIs or other communication interfaces to allow separate management applications to view, set, and/or adjust the QoS settings and/or to provide one or more user interfaces to the system administrator to view, set, and/or adjust the QoS settings.

To help improve latency within distributed storage system 100, the results of the storage request may also be stored in a cache located in the storage units 141-149, in storage controller 120, and/or in the respective client 111-119. Depending upon where and how the results may be cached, subsequent storage requests for the same information or data may be directed to the respective cache rather than being forwarded to the storage units 141-149.

Figure 2:
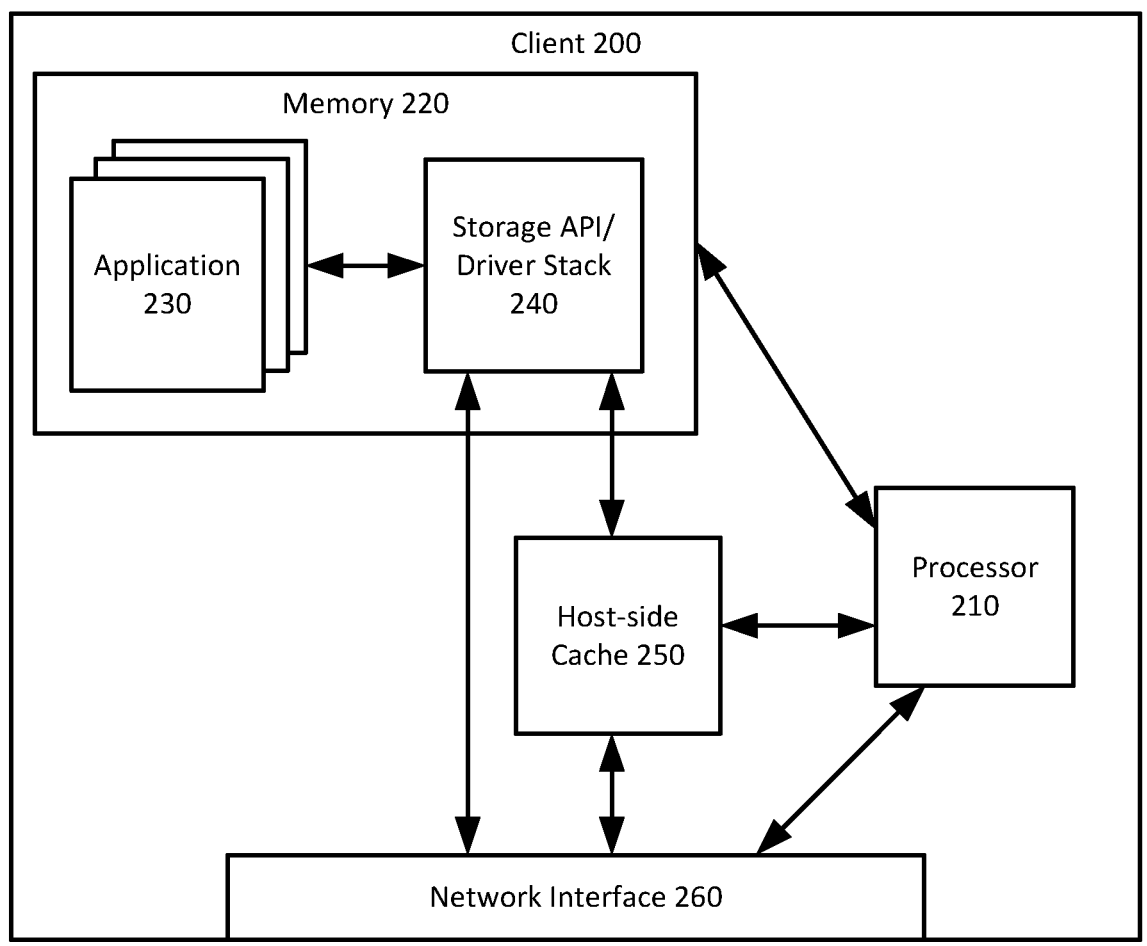
FIG. 2 is a simplified diagram of an example client according to some embodiments.

FIG. 2 is a simplified diagram of an example client 200 according to some embodiments. According to some embodiments, client 200 may be representative of any of the clients 111-119. Client 200 may be any kind of computer system including a standalone workstation, a cluster, a production server, within a virtual machine, and/or the like. As shown in FIG. 2, client 200 includes a processor 210 coupled to memory 220. In some examples, processor 210 may control operation and/or execution of hardware and/or software on client 200. Although only one processor 210 is shown, client 200 may include multiple processors, multi-core processors, microprocessors, digital signal processors (DSPs), application specific integrated circuits (ASICs), field programmable gate arrays (FPGAs), and/or the like. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 220 may be used to store several software packages and systems that are executed by processor 210. This includes at least one or more applications 230 and an API/driver stack 240. The applications 230 may include user applications, service applications, maintenance applications, operating system services, and/or the like. As each of the applications 230 make storage requests, they typically do so through the storage API/driver stack 240, which provides the applications 230 with access to storage, wherever it may be located in a storage system, using an interface that abstracts the details regarding the location and the devices that implement the storage.

Depending upon the content of a storage request and whether the results of the storage request have been previously stored in a host-side cache 250, the storage API/driver stack 240 may direct the storage request to host-side cache 250 for handling or direct the storage request to a network interface 260 for forwarding to a storage controller, such as storage controller 120. In some cases, the host-side cache 250 may also direct the storage request to the network interface 260 for forwarding to the storage controller, such as when a write-back or other cache operation is performed. Although not shown in detail, the host-side cache 250 may include a cache controller and cache memory. The cache memory may include a machine readable media, such as RAM, FLASH-EPROM, and/or any other memory chip or cartridge suitable for use in a cache memory. Host-side cache 250 is also coupled to processor 210 and may be subject to monitoring and/or control by processor 210.

Network interface 260 may be used to couple client 200 to one or more networks, such as network 130, via one or more network links so that storage requests and other information may be transmitted to and from client 200 over the networks. Network interface 260 may include one or more circuits that may be used to buffer incoming and outgoing information, generate and interpret network signals, and/or the like. In some examples, the one or more circuits may include one or more modems, codecs, line drivers, wireless antennas, and/or the like so that client 200 may be coupled to wireless networks, Ethernets, asynchronous transfer mode (ATM) networks, and/or the like. Network interface 260 is also coupled to processor 210 and may be subject to monitoring and/or control by processor 210.

Figure 3:
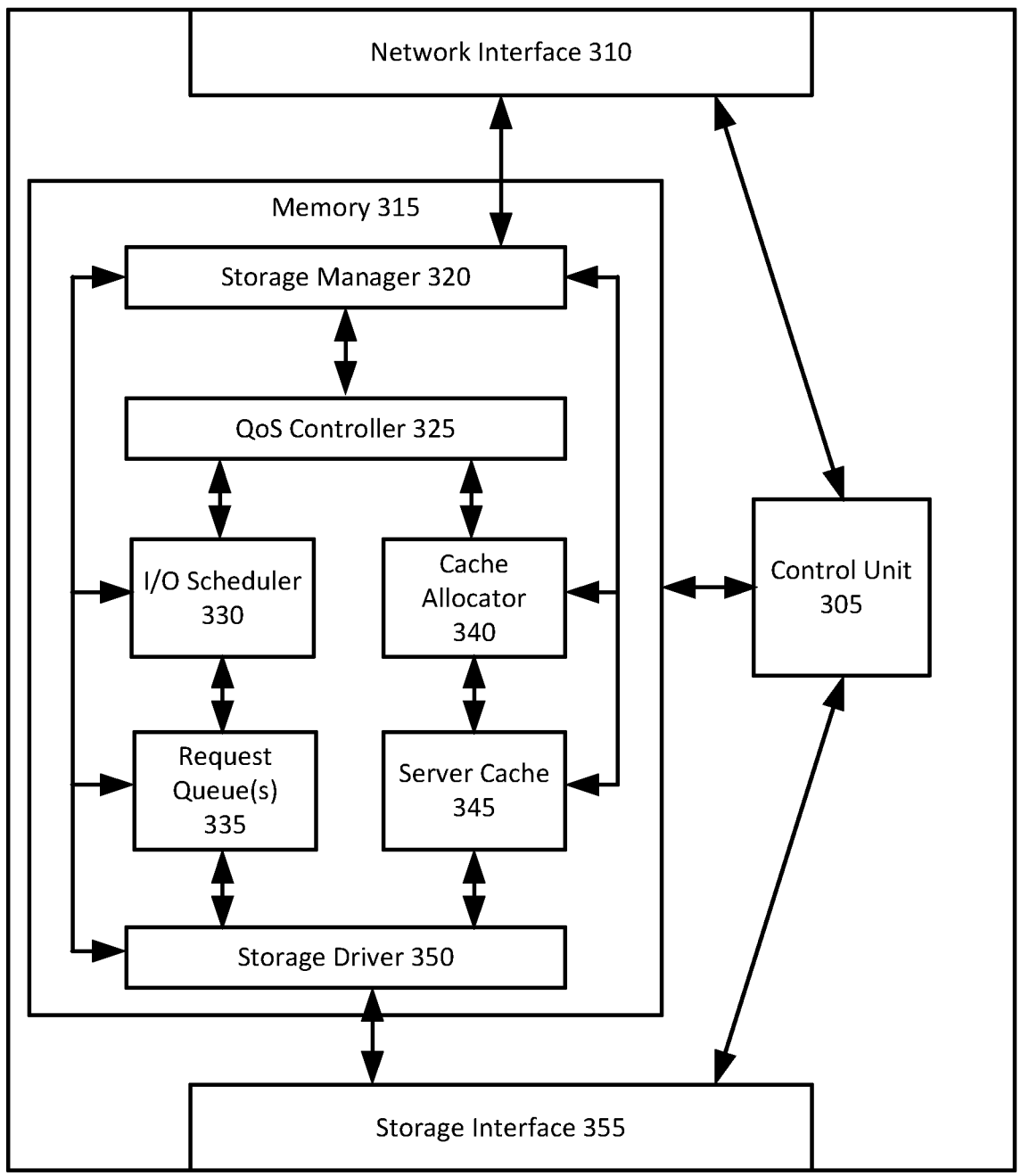
FIG. 3 is a simplified diagram of an example storage controller according to some embodiments.

FIG. 3 is a simplified diagram of an example storage controller 300 according to some embodiments. According to some embodiments, storage controller 300 may be one possible embodiment of storage controller 120. Storage controller 300 may be any kind of computer system including a standalone workstation, a cluster, a production server, within a virtual machine, a special purpose computing device, and/or the like. As shown in FIG. 3, storage controller 300 includes a control unit 305. In some examples, control unit 305 may control operation and/or execution of hardware and/or software on storage controller 300. In some examples, control unit 305 may include one or more processors, multi-core processors, microprocessors, DSPs, ASICs, FPGAs, and/or the like.

Storage controller 300 is further coupled to one or more networks, such as network 120, using a network interface 310 and one or more network links. In some examples, network interface 310 may be used to receive storage requests from one or more applications on behalf of storage controller 300 and transmit the responses to the storage requests back to the applications. Similar to network interface 260, network interface 310 may include one or more circuits that may be used to buffer incoming and outgoing information, generate and interpret network signals, and/or the like. In some examples, the one or more circuits may include one or more modems, codecs, line drivers, wireless antennas, and/or the like so that storage controller 300 may be coupled to wireless networks, Ethernets, ATM networks, and/or the like. Network interface 310 is also coupled to control unit 305 and may be subject to monitoring and/or control by control unit 305.

Storage controller 300 also includes memory 315 that is coupled to control unit 305. Memory 315 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 315 may be used to store several software packages and systems that are executed by control unit 305. This may include at least a storage manager 320, a QoS controller 325, an I/O scheduler 330, a cache allocator 340, one or more request queues 335, a server cache 345, and/or a storage driver 350.

Storage manager 320 may be responsible for overseeing and/or coordinating the storage operations being performed by storage controller 300 including the operation of network interface 310, QoS controller 325, I/O scheduler 330, cache allocator 340, request queues 335, server cache 345, storage driver 350, and/or a storage interface 355. For example, when storage requests are received from one or more applications at network interface 310, they are sent to storage manager 320 for further handling. Storage manager 320 may examine the storage requests and determine which storage units they are associated with. Storage manager 320 may also place the storage requests in one or more of the request queues 335 for later handling, use the server cache 345 to handle the request, and/or send the storage requests to the storage driver 350 for handling.

Storage manager 350 may also include one or more interfaces for allowing a system administrator to monitor and/or manage the operation of storage controller 320. In some examples, the one or more interfaces may include one or more command line interfaces (CLIs), web interfaces, graphical user interfaces (GUIs), remote procedure calls (RPCs), web services, and/or the like. In some examples, these interfaces may be used be used by monitoring and/or control applications hosted in other computing devices, such as any of the clients 111-119. In some examples, the one or more interfaces may include interfaces for monitoring the performance of a storage system and/or one or more applications using the storage system and/or interfaces for monitoring and/or adjusting QoS settings and/or parameters for the storage system and/or the applications. In some examples, the QoS settings may be associated with operation of the request queues 335, server cache 345, and/or caches located in other parts of the storage system. In some examples, the interfaces may receive performance setting commands from the system administrator, which are discussed in greater detail below. In some examples, the performance setting commands may be passed to QoS controller 325.

According to some embodiments, QoS controller or performance manager 325 may be responsible for monitoring, managing, and/or controlling the QoS mechanisms for storage controller 300 and the storage system of which it is a part. In a typical storage controller or QoS controller, the performance setting commands available to the system administrator are often limited. In some examples, the performance setting commands allow the system administrator to examine specific QoS settings (e.g., a latency target for an application, a cache share for an application, a throughput target for an application, a queue share for an application, and/or the like) and/or set values for one of the QoS settings. In most cases the performance setting commands provide limited or no ability for the system administrator to manage or directly observe the interrelationships among the QoS settings. As such, successful use of this limited set of performance commands by the system administrator to manage the performance of applications depends on the system administrator having an understanding of how the QoS settings impact the performance of the applications and how changing one QoS setting may create a ripple effect that may have unintended consequences for other applications using the storage system.

In contrast, QoS controller 325 provides an enhanced set of performance commands that improve the ability of the system administrator to use the QoS settings to achieve desired performance levels for the applications using the storage system. Rather than having the system administrator directly view, set, and/or adjust individual QoS settings, the enhanced set of performance commands allow the system administrator to more intuitively manage the QoS settings at a storage system-wide level in a way that is not possible to directly do using the more limited set of performance commands supported by other QoS controllers. In addition, the enhanced set of performance commands provide the system administrator with the ability to manage applications by focusing on their performance rather than having to focus on the underlying QoS mechanisms that indirectly affect performance. This is possible, because QoS controller 325 keeps track of and manages the underlying QoS settings on behalf of the system administrator based on the performance focused commands in the enhanced set of performance commands. This allows the system administrator to focus on performance of the applications rather than worrying about the complex details of managing the QoS settings for the applications and the storage system or fully understanding how changing the QoS settings for one application is likely to negatively impact another application.

To achieve this intuitive level of performance management, QoS controller 325 and the enhanced set of performance commands support the classification of applications by the system administrator, determining usage of storage system resources by the applications, setting and monitoring QoS targets, adjusting QoS settings, and/or the like. For example, to help simplify the management of applications using the storage system, each of the applications may be classified as either a latency or a throughput application. Latency applications are applications desiring upper limits on the response time or latency of storage requests. Throughput applications are applications desiring handling large amounts of data or bandwidth or large number of IOPS.

QoS controller 325 also helps set and manage latency and/or throughput targets for the applications. This includes monitoring the actual latency of storage requests, the amount of data being processed, and/or the number of IOPS being handled for each of the applications. To support these activities, QoS controller 325 may receive one or more QoS-related commands from the system operator through storage manager 320. In some examples, these may include commands to maintain or preserve the QoS settings for an application, accelerate the application by improving the QoS settings for an application, and/or releasing management of the QoS settings for the application to QoS controller 325. QoS controller 325 maintains the QoS settings for an application by locking the QoS settings at their current level so that subsequent changes to the QoS settings of other applications do not change the locked QoS settings. QoS controller 325 improves or accelerates the QoS settings for an application by determining the current QoS settings or allocated share of storage system resources for the application and increasing that share by taking shares from other applications whose QoS settings are not locked. QoS controller releases the QoS settings of previously maintained applications by unlocking the allocated share for those applications so that portions of those shares may be taken when other applications are later accelerated.

How QoS controller 325 maintains and/or accelerates an application depends on whether the application is classified as a latency application or a throughput application. In some examples, throughput for an application may be managed by controlling how much access storage requests for the application are given to the request queues 335 by the I/O scheduler 330. In a system without QoS mechanisms, storage requests are typically placed in a single request queue and then handled on a first-come first-served basis. The order and quantity of storage requests from the applications is typically not regulated by the storage controller except in the case where the request queue becomes full. In some examples, QoS controller 325 may more affirmatively control access to the request queues 335 by assigning priorities and/or shares to the various applications and instruct I/O scheduler 330 to enforce the priorities and/or shares.

In some examples, I/O scheduler 330 may manage access to the request queues 335 by using a token bucket system. In a token bucket system, the capacity of the request queues 335 is converted into tokens. As storage requests are processed, tokens become available and as storage requests are placed in the request queues, tokens are consumed. Depending upon the implementation, each token may represent one storage request for a QoS approach that is managing IOPS or each token may correspond to the amount of bandwidth available for storage requests for a QoS approach that is managing bandwidth. Access to the request queues 335 is then given to applications possessing tokens which the applications use to have storage requests placed in the request queues 335. Access to the request queues 335 is then managed by controlling how many of the free tokens are given to each of the applications, subject to upper limits on how many tokens each application may hold to prevent inactive applications from hording too many of the tokens. In some examples, QoS controller 325 may instruct I/O scheduler 330 to allocate a different percentage of free tokens to each of the applications. Thus, by controlling the percentages, QoS controller 325 may control how much access an application may be given to the request queues 335 relative to the other applications. In this way, QoS controller 325 may accelerate an application by assigning it a greater percentage of the free tokens and reducing the percentage of tokens assigned to the other applications. QoS controller may also maintain access to the request queues 335 for an application by locking the percentage assigned to the application so that it is not reduced when other applications are accelerated.

In some examples, latency for an application may be managed by controlling how much access storage requests for the application are given to the server cache 345 and/or other caches in the storage system by cache allocator 340. In a system without QoS mechanisms, storage requests are typically cached using a general purpose cache replacement strategy, such as least recently used (LRU) or first-in first out (FIFO). Data from storage requests are then cached using a single pool of space irrespective of the application associated with the storage requests. Thus data cached for one application may be replaced by data from another application slowing subsequent storage requests from the first application. In some examples, QoS controller 325 may more affirmatively control access to the server cache 345 and/or the other storage system caches by assigning priorities and/or shares to the various applications and instruct cache allocator 340 to enforce the priorities and/or shares.

In some examples, cache allocator 340 may manage access to server cache 345 and the other storage system caches by allocating a greater or lesser percentage of the storage in server cache 345 and the other storage system caches to each of the applications using cache space so that each of the applications is subject to a higher or lower cache hit rate when storage requests are processed. When cache replacement takes place, the new data is placed into the cache and replaces space previously used by other data for the same application. This, in effect, divides server cache 345 and the other storage system caches into separate caches reserved for each of the applications.

Because server cache 345 and the other storage system caches introduce different latencies in the handling of storage requests, QoS controller 325 may also manage which of server cache 345 and the other storage system caches are used for each of the applications. As a general rule, the closer a cache is to an application, the lower the latency for storage requests that may be handled via a hit in the respective cache. For example, latencies below 100 μs are possible in host-side caches, like host-side cache 250, server caches, like server cache 345, implemented using flash-cache technologies have latencies between 100 μs and 1 ms, and storage unit caches have latencies above 1 ms. Thus, by keeping track of the latency targets for each application, QoS controller 325 may determine which type of cache, host-side, server, or storage unit, should be used for each application. QoS controller 325 may also accelerate the latency for an application by allocating a greater share of the cache space to the application and, as appropriate, promoting the application to a cache type with lower latency. Similar to its management of the request queues 335, QoS controller 325 may also maintain or lock the share of cache space allocated to an application, take cache allocation from unlocked applications to accelerate an application, and remove the lock on the cache allocation for an application.

Storage controller 300 also includes the storage driver 350. Storage driver 350 plays a similar role in storage controller 300 as the storage API/driver stack 240 does for client 200. Because different types of storage units may be used in the storage system, storage controller 300 relies on storage driver 350 to provide access to the storage units, irrespective of their type or where they are located, by providing an interface that abstracts the details of the particular storage units. As storage requests are removed from the request queues 335 by the I/O scheduler 330 for handling, they are passed to the storage driver 350, which converts them to specific commands and/or messages to be sent to the corresponding storage unit through the storage interface 355. Further, as responses to the storage requests are received, the results may be returned to the respective application through storage manager 320 and/or provided to server cache 345 for caching.

Storage interface 355 may be used to couple storage controller 300 to one or more cables or networks, such as network 150, so that data may be read from and written to the storage units over the cables or networks. Storage interface 355 may include one or more circuits that may be used to buffer incoming and outgoing information, generate and interpret network signals, and/or the like. In some examples, the one or more circuits may include one or more modems, codecs, line drivers, wireless antennas, and/or the like so that storage controller 300 may be coupled to the storage units via SCSI, USB, PCI, PCI-X, PCIe, FireWire, and/or other interfaces, wireless networks, Ethernets, ATM networks, and/or the like. Storage interface 355 is also coupled to control unit 305 and may be subject to monitoring and/or control by control unit 305. In some embodiments, storage interface 355 may be part of network interface 310.

The scope of embodiments of storage controller 300 is not limited to the arrangement of structures and elements as shown in FIG. 3. According to certain embodiments one or more of the features of and/or operations performed by storage manager 320, QoS controller 325, I/O scheduler 330, cache allocator 340, request queues 335, server cache 345, and/or storage driver 350 may be implemented in forms other than software. In some examples, one or more of the features and/or operations may be performed in hardware, such as in ASICs and/or FPGAs, and/or via a combination of hardware and software.

According to certain embodiments storage controller 300 may include more than one storage controller. One of ordinary skill would recognize that many possible arrangements for two or more storage controllers are possible. In some examples, storage controller 300 may be two storage controllers configured in a high availability storage controller pair in which the two storage controllers may operate in parallel with one providing primary handling for storage requests and the other acting in an active stand-by capacity. In some examples, storage controller 300 may include two or more storage controllers operating in parallel and sharing responsibility for handling the storage requests with each of the storage controllers handling a portion of the requests. In some examples, the two or more storage controllers may also act as backup storage controllers for the other storage controllers.

Figures 4, 8:
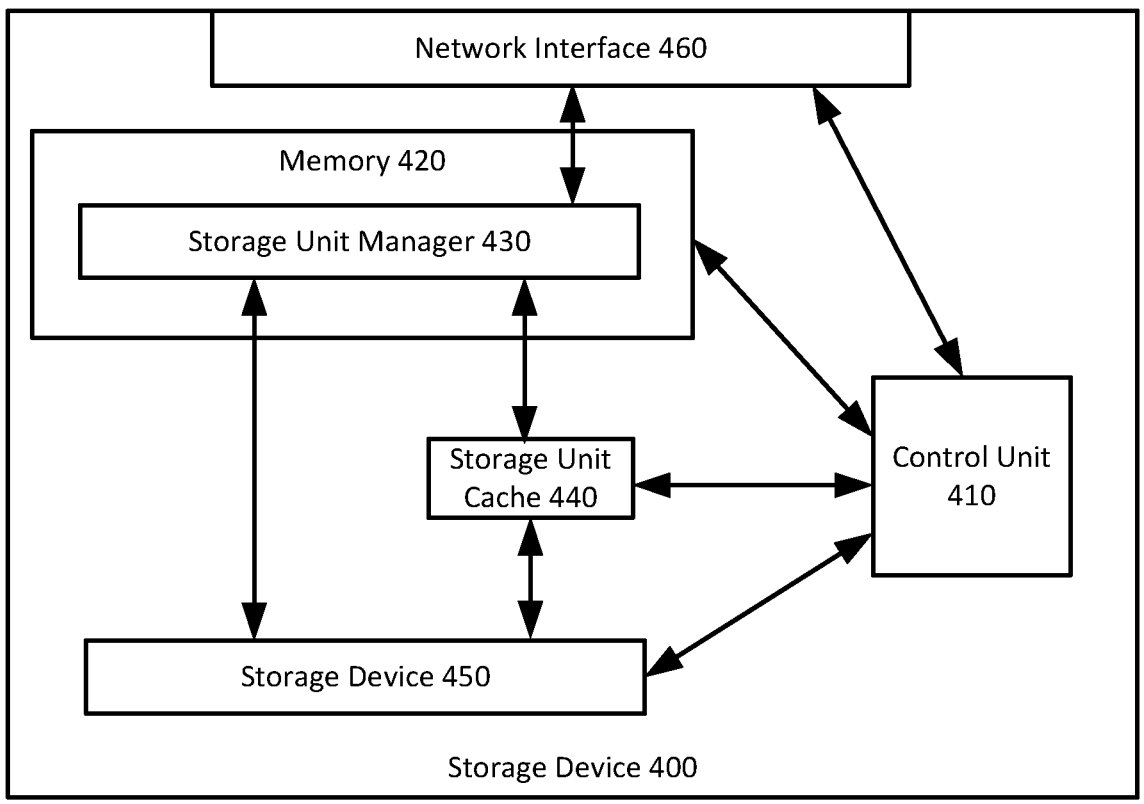
FIG. 4 is a simplified diagram of an example storage unit according to some embodiments.
FIG. 8 is a simplified diagram of an example user interface for specifying performance commands according to some embodiments.

FIG. 4 is a simplified diagram of an example storage unit 400 according to some embodiments. According to some embodiments, storage unit 400 may be representative of any of the storage units 141-149. As shown in FIG. 4, storage unit 400 includes a control unit 410 coupled to memory 420. In some examples, control unit 410 may control operation and/or execution of hardware and/or software on storage unit 400. Control unit 410 may include one or more processors, multi-core processors, microprocessors, DSPs, ASICs, FPGAs, and/or the like. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 420 may be used to store software packages and systems that are executed by control unit 410. This includes at least storage unit manager 430. Storage unit manager 430 may include firmware and/or the like for managing one or more storage devices, such as a storage device 450. For example, storage unit manager 430 may control which blocks, sectors, and/or storage locations are accessed on the storage device 450 to satisfy read and write requests sent to storage unit 400. Depending upon the read and/or write requests being handled by storage unit 400 and whether the results of the storage request have been previously stored in a storage unit cache 440, the storage unit manager 430 may direct the storage request to storage unit cache 440 for handling or direct the storage request to storage device 450. Although not shown in detail, the host-side cache 450 may include a cache controller and cache memory. The cache memory may include a machine readable media, such as RAM, FLASH-EPROM, and/or any other memory chip or cartridge suitable for use in a cache memory. Storage unit cache 440 is also coupled to control unit 410 and may be subject to monitoring and/or control by control unit 410.

Storage unit 400 also includes storage device 450 that is coupled to control unit 410. Storage device 450 includes the storage media that is the subject of read and write requests received by storage unit 400. Storage device 450 may include one or more types of machine readable media. Some common forms of machine readable media may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. Storage device 450 is also coupled to control unit 410 and may be subject to monitoring and/or control by control unit 410.

Network interface 460 may be used to couple storage unit 400 and storage unit manager 430 to one or more cables or networks, such as network 150, so that the data to be written to storage device 450 may be received from a storage controller, such as storage controller 300, and data read from storage device 450 may be returned to the storage controller over the cables or networks. Network interface 460 may include one or more circuits that may be used to buffer incoming and outgoing information, generate and interpret network signals, and/or the like. In some examples, the one or more circuits may include one or more modems, codecs, line drivers, wireless antennas, and/or the like so that storage unit 400 may be coupled to the storage controller via SCSI, USB, PCI, PCI-X, PCIe, FireWire, and/or other interfaces, wireless networks, Ethernets, ATM networks, and/or the like. Network interface 460 is also coupled to control unit 410 and may be subject to monitoring and/or control by control unit 410.

Figure 5:
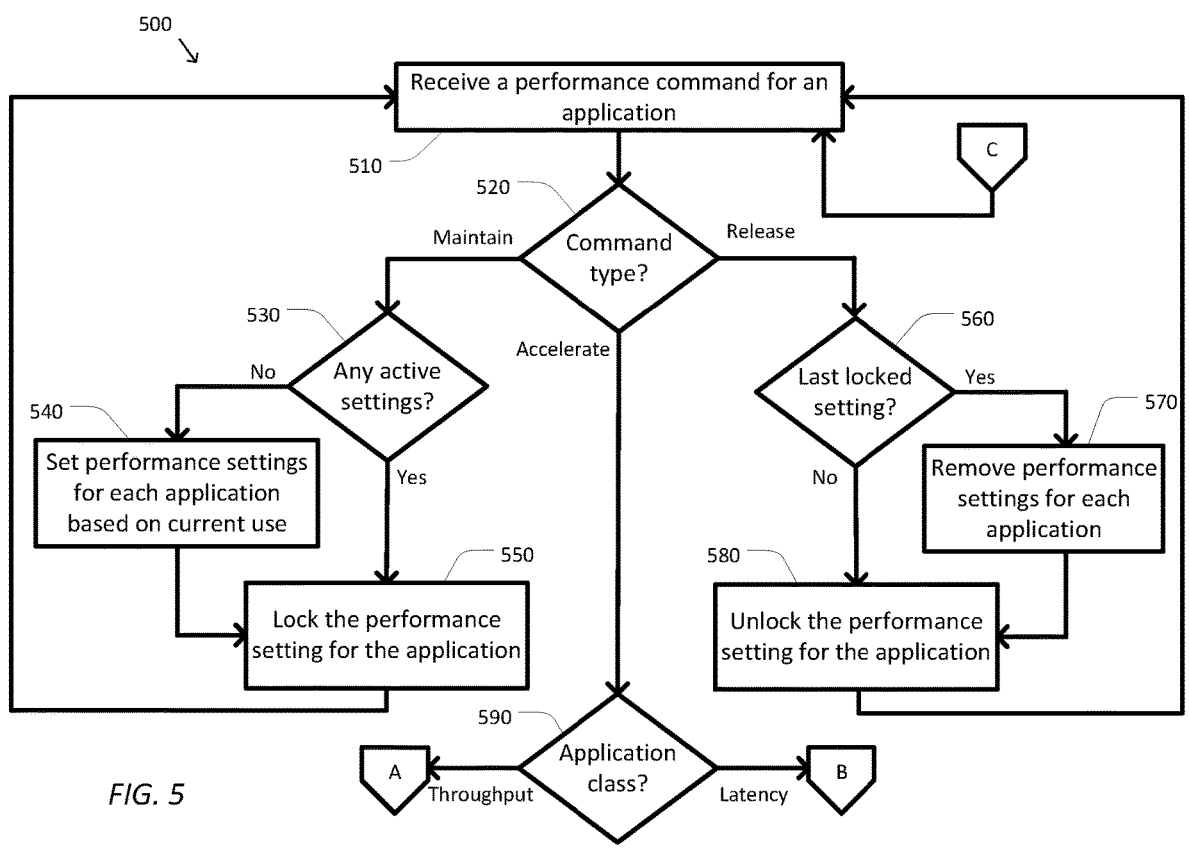
FIGS. 5, 6, and 7 are simplified diagrams of an example method of performance management for applications in a storage system according to some embodiments.
Figure 6:
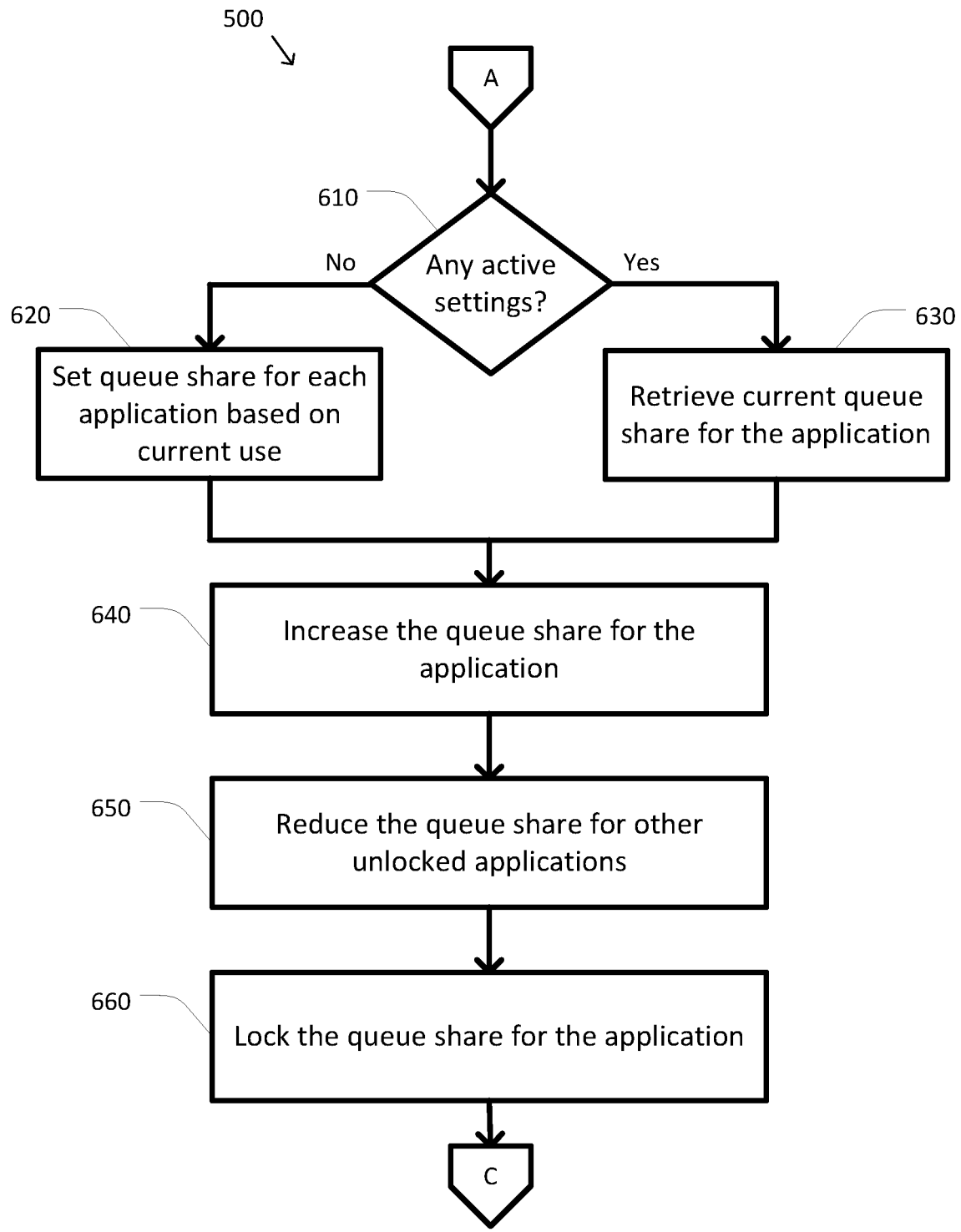
Figure 7:
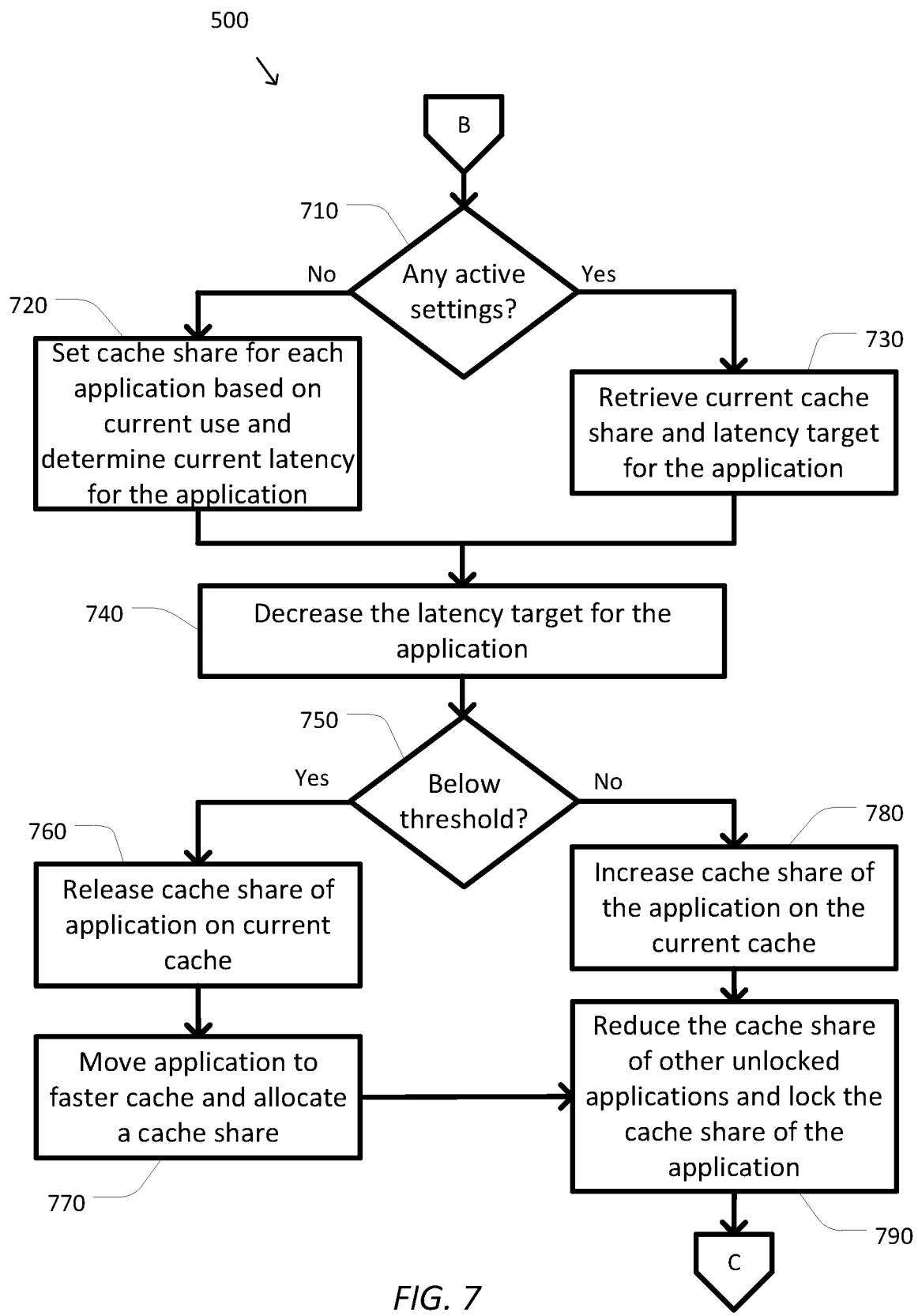

FIGS. 5, 6, and 7 are simplified diagrams of an example method 500 of performance management for applications in a storage system according to some embodiments. One or more of the processes 510-590, 610-660, and 710-790 of method 500 may be implemented, at least in part, in the form of executable code stored on non-transient, tangible, machine readable media that when run by one or more processors (e.g., the one or more processors of control unit 305) may cause the one or more processors to perform one or more of the processes 510-590, 610-660, and/or 710-790. For example, method 500 may be implemented by the storage controller 120 and/or 300 and/or by QoS controller 325.

At a process 510, a performance command for an application is received. The performance command may be received from a system administrator and/or a system monitoring the applications using a storage system. In some examples, the performance command may be received by one or more messages received over a network, via an API, RPC, or web service call, activation of a control on a user interface, and/or the like. In some examples, the messages, calls, or control may communicate an identifier of the application to which the performance command is to be applied, a type for the performance command, and any other parameters of the performance command. The type of performance command may indicate to maintain the current QoS commands for the application, accelerate the application, or release a previous performance command. In some examples, the accelerate performance command may be one of two or more possible accelerate commands based on how much acceleration of the application is desired.

FIG. 8 is a simplified diagram of an example user interface 800 for specifying performance commands according to some embodiments. It should be understood that the user interface 800 is representative only and that other types and arrangements of user interfaces may be used to obtain performance commands from a system administrator. In some embodiments, user interface 800 may be provided as a web interface hosted by a storage server, such as storage server 120 and/or 300, or as a dialog within a storage system application hosted in a client, such as any of clients 111-119 and/or 200, or other computing device. As shown in FIG. 8, user interface 800 includes a list 810 of applications 821-829 currently using a storage system. User interface 800 further includes additional status information about each of the applications 821-829. A class column 830 is an optional column that indicates whether the respective application 821-829 is classified as a latency or a throughput application. As shown, applications 821 and 829 are classified as throughput applications and application 822 is classified as a latency application. A status column 840 indicates a current performance setting for each of the applications 821-829. The status column 840 may be used to indicate whether the respective application 821-829 was the subject of a previous performance command that is still in force. An indication of "Maintain" in the status column 840 indicates that the respective application (applications 822 and 829 as shown) was previously the subject of a command to maintain or accelerate the performance level of the respective application. The "Maintain" indicator indicates that the resources of the respective application should not be given to other applications that are the subject of an accelerate command. A command column 850 includes an control input for each of the applications 821-829 that allow the system administrator to select whether a command to maintain, accelerate, or release the performance level of the respective application 821-829. As shown in FIG. 8, each control input is implemented as a drop-down menu (although other selection type input controls are possible), with the drop down menu for application 829 shown as a drop down menu 860. As drop down menu 860 shows, the possible performance commands for application 829 are none, maintain current settings, several levels of accelerate (A-N), and release. By selecting one of the commands via drop down menu 860, the system administrator may generate a performance command to be sent to the storage controller or QoS controller indicating that the performance of application 829 is subject to the selected performance command. In some examples, this performance command may be the performance command received by the storage controller during process 510.

Referring back to FIG. 5, at a process 520, the type of the performance command is determined. The performance command received during process 510 is examined to determine the type of the performance command, which may be maintain, accelerate, or release. In some examples, the type of the performance command may be determined by a value found in one more fields of the messages in which the performance command was received, as a parameter of the function call by which the performance command was received, by the specific function call by which the performance command was received, and/or the like. Performance commands of different types are handled differently. When the performance command is a maintain command, the performance command is processed beginning with a process 530. When the performance command is a release command, the performance command is processed beginning with a process 560. And, when the performance command is an accelerate command, the performance command is processed beginning with a process 590.

At the process 530, it is determined whether any active performance settings have been set for the storage system. When applications first begin using the storage system no performance or QoS settings may be set for the applications. In many cases, the applications are allowed to use the storage system with unrestricted access to the resources of the storage system until the performance of one or more the applications fails to achieve suitable performance levels. In some examples, this may correspond to the case where no QoS settings for the request queues and/or the caches have been set for the applications. Whether any active QoS or performance settings are in use may be tracked by maintaining one or more QoS data structures storing the corresponding settings for each of the applications. In some examples, the QoS data structures may be indexed by identifiers for the applications and may indicate the share of the request queues and/or the caches allocated to the respective application. When the QoS data structures are empty, indicating that no shares are allocated, then there are no active performance settings. When there are no active performance settings, the performance settings are determined using a process 540. When there are active performance settings, the performance settings for the application associated with the performance command are locked at their current levels using a process 550.

At the process 540, the performance settings for each application are set based on current use. When no prior performance or QoS settings exist for any of the applications, the QoS controller determines baseline values for the settings based on the current use of the storage system resources for the applications. In some examples, the QoS controller may access a monitoring system that records data and/or computes metrics related to the current usage of the storage system. In some examples, the QoS controller may use this information to determine a current share of the request queues and/or the caches being used by the applications. In some examples, the QoS controller may determine the current shares of the request queues when the performance command being processed is associated with a throughput application or the current shares of the caches when the performance command being processed is associated with a latency application. In some examples, the current shares are then set as the QoS or performance settings for the applications. In some examples, the current shares may be provided to the I/O scheduler or cache allocator of the storage system as QoS settings for the respective applications. In some examples, the current shares may also be recorded in the QoS data structures. As an illustrative example, when a maintain command is received for a throughput application, the token share of each of the applications may be set to the current usage levels. In some examples, the QoS data structures storing the QoS or performance settings may also be updated and the I/O scheduler and/or cache allocator notified of the settings. The performance setting for the application associated with the maintain command is then locked using process 550.

At the process 550, the performance setting for the application is locked. The goal of the maintain command is to protect the resource shares of the application from being allocated to other applications that are being accelerated. In some examples, this may include protecting the share of the request queues allocated to a throughput application and/or the share of the caches allocated to a latency application. To do this, the QoS data structures are marked with a locked indicator in a data field corresponding to the resource share that is being locked. After the performance setting is locked, method 500 returns to process 510 to wait for another performance command.

At the process 560, it is determined whether the release command is releasing the last locked setting for the storage system. In some examples, the QoS data structures may be examined to determine whether the release command being processed is removing the last remaining locked QoS or performance setting. In some examples, the locked indicator for each of the QoS or performance settings may be examined to see whether the QoS or performance setting being released or unlocked is the only locked QoS or performance setting in the QoS data structures. When the last locked setting is being released, the performance settings for each of the applications are removed using a process 570. When the setting being released is not the last locked setting, then the setting associated with the release command is unlocked using a process 580.

At the process 570, the performance settings for each of the applications are removed. When process 560 determines that none of the applications are having their performance protected via the QoS or performance settings, then the performance settings for each of the applications are removed from the system. In some examples, the I/O scheduler and/or the cache allocator are notified to remove each of the shares being enforced on the request queues and/or the caches, respectively. In some examples, this turns the request queues and/or the caches into fully shared resources with no restrictions being placed on their use by any of the applications. In some examples, the QoS data structures may also be cleared. The performance setting for the application associated with the release command is then unlocked using process 580.

At the process 580, the performance setting of the application is unlocked. The goal of the release command is to allow the storage system resources currently allocated to the application associated with the release command to be given to other applications when those applications are accelerated. To do this, the QoS data structures are updated to remove the locked indicator from the entry for the corresponding application. After the performance setting is unlocked, method 500 returns to process 510 to wait for another performance command.

At the process 590, the classification of the application is determined. The classification of the application associated with the accelerate command received during process 510 is examined to determine whether the application is a throughput application or a latency application. When the application is a throughput application, the accelerate command is processed beginning with a process 610. When the application is a latency application, the accelerate command is processed beginning with a process 710.

At the process 610, it is determined whether any active performance settings have been set for the storage system. Using a process similar to process 530, it is determined whether there are any active performance settings in use by the storage system. When there are no active performance settings, the queue shares for the applications are determined using a process 620. When there are active performance settings, the queue share for the application associated with the accelerate command is retrieved using a process 630.

At the process 620, the queue shares for each application is set based on current use of the request queues. When no prior performance or QoS settings exist for any of the applications, the QoS controller determines baseline values for the queue shares based on the current use of the request queues by the applications. In some examples, the QoS controller may access a monitoring system that records data and/or computes metrics related to the current usage of the request queues. In some examples, the current queue shares are then set as the queue share settings for the applications. In some examples, the current queue shares may be provided to the I/O scheduler as the queue share settings for the respective applications. In some examples, the current queue shares may also be recorded in the QoS data structures. The queue share setting for the application associated with the accelerate command is then increased using a process 640.

At the process 630, the current queue share for the application is retrieved. In some examples, the QoS data structures storing the queue share settings for the applications may be examined to look up the current queue share for the application associated with the accelerate command. In some examples, the identifier for the application associated with the accelerate command may be used as an index into the QoS data structures to retrieve the current queue share. The queue share setting for the application associated with the accelerate command is then increased using the process 640.

At the process 640, the queue share for the application is increased. The goal of the accelerate command is to provide more resources to the corresponding application. When the application associated with the accelerate command is a throughput application, this may be done by giving the application a greater share of the requests queue. In some examples, the current queue share for the application as determined during process 620 or retrieved during process 630 may be increased by a percentage associated with the accelerate command. In some examples, when more than one level of acceleration is supported the amount of the percentage increase may be based on the acceleration level and/or provided as a parameter to the accelerate command. In some examples, when three levels of acceleration are supported, the percentage increases may be 20% for low acceleration, 50% for medium acceleration, and 100% for high acceleration; although it is understood that any number of acceleration levels with differing percentages are possible. As an example, when the current queue share for the application is 10% and the percentage increase is 20%, the new queue share for the application would become 12% (10%*1.2). In some examples, the QoS data structures may be updated with the queue share for the application. In some examples, when the queue share is increased to a level above 100% or above a configurable percentage, an error message may be generated and method 500 may return to process 510 to wait for another performance command.

At a process 650, the queue share for other unlocked applications is reduced. Because the request queues are a finite resource, an increase in queue share for one of the applications is taken from other applications using the request queues. Rather than take the increase in queue share from each of the other applications, the increase is taken from the other applications that are unlocked. In some examples, the locking indicator in the QoS data structures may be used to determine which of the other applications are unlocked. In some examples, the queue shares may be taken evenly from each of the other applications. In some examples, the queue shares may be taken from the other applications using a prorated scale based on the size of each of the other applications' respective queue share so that applications with a larger queue share contribute more queue share to support the increase in the queue share of the accelerated application. As the queue shares are taken from each of the other unlocked applications, the QoS data structures are updated accordingly. In some examples, the I/O scheduler may also be notified of the changes in queue shares. In some examples, when sufficient queue share is not available to support the increase in the queue share of the accelerated application (e.g., because too many applications are locked), an error message may be generated and method 500 may return to process 510 to wait for another performance command.

At a process 660, the queue share for the application is locked. Using a process similar to process 550, the queue share for the application being accelerated by the accelerate command is locked so that it is protected from being taken when other applications are accelerated in the future. After the queue share is locked, method 500 returns to process 510 to wait for another performance command.

At the process 710, it is determined whether any active performance settings have been set for the storage system. Using a process similar to processes 530 and 610, it is determined whether there are any active performance settings in use by the storage system. When there are no active performance settings, the cache shares for the applications are determined using a process 720. When there are active performance settings, the cache share for the application associated with the accelerate command is retrieved using a process 730.

At the process 720, the cache shares for each application is set based on current use of the caches and the current latency for the application is determined. When no prior performance or QoS settings exist for any of the applications, the QoS controller determines baseline values for the cache shares based on the current use of the caches by the applications. In some examples, the QoS controller may access a monitoring system that records data and/or computes metrics related to the current usage of the caches. In some examples, the current cache shares are then set as the cache share settings for the applications. In some examples, the current cache shares may be provided to the cache allocator as the cache share settings for the respective applications. In some examples, the current cache shares may also be recorded in the QoS data structures. In some examples, the monitoring system may also be used to determine a current latency of the responses of the storage system to storage requests made by the application. In some examples, the current latency may be based on an aggregate latency (e.g., an average) of recent storage requests. In some examples, the current latency for the application may also be stored in the QoS data structures as a latency target for the application. The latency target for the application associated with the accelerate command is then decreased using a process 740.

At the process 730, the current cache share and latency target for the application is retrieved. In some examples, the QoS data structures storing the cache share settings and the latency targets for the applications may be examined to look up the current cache share and latency target for the application associated with the accelerate command. In some examples, the identifier for the application associated with the accelerate command may be used as an index into the QoS data structures to retrieve the current cache share and latency target. The latency target for the application associated with the accelerate command is then decreased using the process 740.

At the process 740, the latency target for the application is increased. The goal of the accelerate command for latency applications is to reduce the latency of storage requests. In general, this is not done directly, but may be indirectly affected by providing more and/or faster cache resources to the corresponding application. In some examples, the current latency for the application as determined during process 720 or the latency target retrieved during process 730 may be decreased by a percentage associated with the accelerate command. In some examples, when more than one level of acceleration is supported the amount of the percentage decrease may be based on the acceleration level and/or provided as a parameter to the accelerate command. In some examples, when three levels of acceleration are supported, the percentage decreases in latency target may be 10% for low acceleration, 30% for medium acceleration, and 50% for high acceleration; although it is understood that any number of acceleration levels with differing percentages are possible. As an example, when the current latency target for the application is 500 µs and the percentage decrease is 30%, the new latency target for the application would become 350 µs (500 µs*0.7). In some examples, the QoS data structures may be updated with the new latency target for the application. In some examples, when the latency target is decreased below any reasonable value so that it cannot practically be obtained, an error message may be generated and method 500 may return to process 510 to wait for another performance command.

At a process 750, it is determined whether the latency target is below a threshold. Because different cache units in the storage system provide different ranges for possible latencies, it is generally not enough to increase cache share for the accelerated application. In some examples, to meet the decreased latency target, the application may have to use a faster cache. In some examples, the thresholds may be determined from configurable thresholds for each of the various cases. In some examples, a threshold of 1 ms may be used to determine when the application should be moved from a storage unit cache, such as storage unit cache 440, to a server cache, such as server cache 345, and a threshold of 100 μs may be used to determine when the application should be moved from the server cache to a host-side cache, such as host-side cache 250. When the latency target is below the threshold, the cache used for the application is changed beginning with a process 760. When the latency target is not below the threshold, the cache share for the application is increased beginning with a process 780.

At the process 760, the cache share for the application on the current cache is released. The cache share on the current cache for the application is reduced to zero. In some examples, the cache released by this reduction may be given to the other applications that have a cache share on the current cache. In some examples, each of the other applications may be allocated an equal portion of the released cache share. In some examples, each of the applications may be allocated a prorated share based on their current cache share. As the cache shares are adjusted, the QoS data structures are updated accordingly. In some examples, the cache allocator may also be notified of the changes in cache shares.

At a process 770, the application is moved to a faster cache and a cache share is allocated. In some examples, the application is moved from a storage unit cache to a server cache or from a server cache to a host-side cache. In some examples, the cache share allocated to the application in the faster cache may be set to a predetermined and configurable cache share, may be set based on a number of applications using the faster cache, based on historical observations between cache share and obtained latency, and/or other approaches. In some examples, the historical observations between cache share and obtained latency may be modeled using a curve fitting approach, such as linear regression and the model may be used to map the new latency target determined during process 740 to the cache share in the faster cache. The QoS data structures may be updated with the allocated cache share. In some examples, the cache allocator may also be notified of the allocated cache share. Once the cache share is allocated, the cache share of other unlocked applications is reduced using a process 790.

At the process 780, the cache share for the application is increased. The goal of the accelerate command is to provide more resources to the corresponding application. When the application associated with the accelerate command is a latency application, this may be done by giving the application a greater share of its current cache. In some examples, the current cache share for the application as determined during process 720 or retrieved during process 730 may be increased by a percentage associated with the accelerate command. In some examples, when more than one level of acceleration is supported the amount of the percentage increase may be based on the acceleration level and/or provided as a parameter to the accelerate command. In some examples, the percentage increase may be the inverse of the percentage decrease used for the latency target during process 740. As an example, when the latency target is decreased by 10%, the cache share may be increased by 11.1% (1.111=1/(1−10%)). In some examples, the QoS data structures may be updated with the new cache share for the application and the cache allocator may also be notified of the new cache share. In some examples, when the cache share is increased to a level above 100% or above a configurable percentage, an error message may be generated and method 500 may return to process 510 to wait for another performance command.

At the process 790, the cache share for other unlocked applications is reduced and the cache share for the application is locked. Because each cache is a finite resource, an increase in cache share for one of the applications is taken from other applications using the same cache. Rather than take the increase in cache share from each of the other applications, the increase is taken from the other applications that are unlocked. In some examples, the locking indicator in the QoS data structures may be used to determine which of the other applications are unlocked. In some examples, the cache shares may be taken evenly from each of the other applications. In some examples, the cache shares may be taken from the other applications using a prorated scale based on the size of each of the other applications' respective cache share so that applications with a larger cache share contribute more cache share to support the increase in the cache share of the accelerated application. As the cache shares are taken from each of the other unlocked applications, the QoS data structures are updated accordingly, and the cache allocator may also be notified of the changes in cache shares. In some examples, when sufficient cache share is not available to support the increase in the cache share of the accelerated application (e.g., because too many applications are locked), an error message may be generated and method 500 may return to process 510 to wait for another performance command. Similar to process 660, after the cache shares are allocated, the cache share for the application being accelerated by the accelerate command is locked so that it is protected from being taken when other applications are accelerated in the future. After the cache share is locked, method 500 returns to process 510 to wait for another performance command.

The scope of embodiments is not limited to the processes shown in FIG. 6. According to certain embodiments, processes 560 and/or 570 may be applied separately for each classification of applications. In some examples, the determination of process 560 and the removal of process 570 may be applied to just the classification of the application whose performance setting is being released or unlocked. In some examples, when the performance setting being released is the last locked setting for share of the request queues then process 570 may be used to remove each of the QoS or performance settings related to share of the request queues. Similarly, when the performance setting being released is the last locked setting for share of the caches then process 570 may be used to remove each of the QoS or performance settings related to share of the caches.

Some examples of storage servers 120 and/or 300 may include non-transitory, tangible, machine readable media that include executable code that when run by one or more processors may cause the one or more processors (e.g., the one or more processors of control unit 220) to perform the processes of method 500 as described above. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A storage controller comprising:
a memory containing machine readable medium comprising machine executable code having stored thereon instructions for performing a method of managing application performance;
a processor coupled to the memory, the processor configured to execute the machine executable code to:
receive, by the storage controller having a first cache, storage requests from a plurality of first applications on a host computer, separate from the storage controller and having a second cache, via a network interface;
in response to receiving an accelerate command associated with a second application, the second application being one of the first applications, the accelerate command including a request to allocate more resources to the second application:
decrease a storage request latency target of the second application;
in response to determining that the decreased latency target is below a threshold:
cause a first partial share of the first cache assigned to the second application to be released;
cause a partial share of the second cache to be allocated as the first partial share, the second cache being faster than the first cache;
cause unlocked second partial shares of the second cache associated with others of the first applications that are not the second application to be decreased; and
cause the first partial share of the second cache allocated to the second application to be locked, the lock preventing an amount of the first partial share from being reduced by accelerate commands for the others of the first applications that are not the second application.

2. The storage controller of claim 1, wherein a sum of the decreases in the unlocked second partial shares is equal to the amount the first partial share is increased.

3. The storage controller of claim 1, wherein each of the unlocked second partial shares is decreased an equal amount.

4. The storage controller of claim 1, wherein each of the unlocked second partial shares is decreased a prorated amount based on respective amounts of the unlocked second partial shares.

5. The storage controller of claim 1, wherein in response to receiving a maintain command associated with a third application, the third application being one of the first applications, the processor causes a third partial share of the first or the second cache allocated to the third application to be locked.

6. The storage controller of claim 1, wherein in response to receiving a release command associated with a third application, the third application being one of the first applications, the processor causes a third partial share of the first or the second cache allocated to the third application to be unlocked.

7. The storage controller of claim 6, wherein in response to determining that the third partial share is a last partial share to be unlocked, the processor further causes the first, second, and third partial shares of the first or the second cache to be released.

8. The storage controller of claim 1, wherein in response to determining that a value for the latency target for the storage requests of the second application is not previously set, the processor further determines, prior to decreasing the latency target, an initial value for the latency target based on a current latency of the storage requests of the second application using the first cache.

9. A method comprising:
receiving, by a quality of service (QoS) controller in a storage server, performance commands, each of the performance commands being associated with a respective application from a plurality of first applications running on a host computer and using a storage system wherein the storage server is configured to receive storage requests from the first applications and has a first cache, and wherein the host computer is separate from the storage server and has a second cache;
in response to receiving a first one of the performance commands that is an accelerate command associated with a second application, the second application being one of the first applications, the accelerate command including a request to allocate more resources to the second application:
decreasing a storage request latency target of the second application;
in response to determining that the decreased latency target is below a threshold:
causing a first partial share of the first cache assigned to the second application to be released;
causing a partial share of the second cache to be allocated as the first partial share, the second cache being faster than the first cache;
causing unlocked second partial shares of the second cache associated with others of the first applications that are not the second application to be decreased; and
causing the first partial share of the second cache allocated to the second application to be locked, the locking preventing an amount of the first partial share from being reduced by accelerate commands for the others of the first applications that are not the second application; and
processing storage requests using the second cache according to the first and second partial shares of the second cache.

10. The method of claim 9, wherein a sum of the decreases in the unlocked second partial shares is equal to the amount the first partial share is increased.

11. The method of claim 9, wherein each of the unlocked second partial shares is decreased an equal amount.

12. The method of claim 9, wherein each of the unlocked second partial shares is decreased a prorated amount based on respective amounts of the unlocked second partial shares.

13. The method of claim 9, further comprising in response to receiving a maintain command associated with a third application, the third application being one of the first applications, causing a third partial share of the first or the second cache allocated to the third application to be locked.

14. The method of claim 9, further comprising in response to receiving a release command associated with a third application, the third application being one of the first applications, causing a third partial share of the first or the second cache allocated to the third application to be unlocked.

15. The method of claim 14, further comprising in response to determining that the third partial share is a last partial share to be unlocked causing the first, second, and third partial shares of the first or the second cache to be released.

16. The method of claim 9, further comprising in response to determining that a value for the latency target for the storage requests of the second application is not previously set, determining, prior to decreasing the latency target, an initial value for the latency target based on a current latency of the storage requests of the second application using the first cache.

17. A non-transitory machine-readable medium having stored thereon instructions for performing a method of managing application performance, comprising machine executable code which when executed by at least one machine, causes the machine to:
   receive performance commands, each of the performance commands being associated with a respective application from a plurality of first applications using a storage system, wherein the storage system has a storage device that is configured to store data of the first applications and has a first cache and wherein the storage system has a storage controller configured to receive storage requests from the first applications and has a second cache;
   in response to receiving a first one of the performance commands that is an accelerate command associated with a second application, the second application being one of the first applications, the accelerate command including a request to allocate more resources to the second application:
      decreasing a latency target for storage requests of the second application;
      in response to determining that the decreased latency target is below a threshold:
         causing a first partial amount of the first cache assigned to the second application to be released;
         causing a partial amount of the second cache to be allocated as the first partial amount, the second cache being faster than the first cache;
         causing unlocked second partial amounts of the second cache associated with others of the first applications that are not the second application to be decreased; and
         causing the first partial amount of the second cache allocated to the second application to be locked, the locking preventing an amount of the first partial amount from being reduced by accelerate commands for the others of the first applications that are not the second application.

18. The non-transitory machine-readable medium of claim 17, wherein the method further comprises in response to receiving a maintain command associated with a third application, the third application being one of the first applications, causing a third partial amount of the first or the second cache allocated to the third application to be locked.

19. The non-transitory machine-readable medium of claim 17, wherein the method further comprises in response to receiving a release command associated with a third application, the third application being one of the first applications, causing a third partial amount of the first or the second cache allocated to the third application to be unlocked.

20. The non-transitory machine-readable medium of claim 17, wherein the method further comprises in response to determining that a value for the latency target for the storage requests of the second application is not previously set, determining, prior to decreasing the latency target, an initial value for the latency target based on a current latency of the storage requests of the second application using the first cache.

\* \* \* \* \*